United States Patent [19]

Kitchen

[11] 4,399,430
[45] Aug. 16, 1983

[54] INTRUDER DETECTION SECURITY SYSTEM

[75] Inventor: Cedric A. Kitchen, Holywell, Wales

[73] Assignee: Pilkington P.E. Limited, St. Helens, United Kingdom

[21] Appl. No.: 309,418

[22] Filed: Oct. 7, 1981

[30] Foreign Application Priority Data

Oct. 10, 1980 [GB] United Kingdom ................ 8032770

[51] Int. Cl.³ ............................................ G08B 13/12
[52] U.S. Cl. .................................. 340/550; 250/227; 340/555; 350/96.23
[58] Field of Search ............... 340/550, 556, 555, 557, 340/815.31; 350/96.23; 250/227

[56] References Cited

U.S. PATENT DOCUMENTS

| | | | |
|---|---|---|---|
| 3,725,891 | 4/1973 | Miller | 340/550 |
| 4,234,875 | 11/1980 | Williams | 340/550 |
| 4,275,294 | 6/1981 | Davidson | 340/555 |
| 4,330,173 | 5/1982 | Oestreich | 350/96.23 |

FOREIGN PATENT DOCUMENTS

| | | | |
|---|---|---|---|
| 275238 | 6/1914 | Fed. Rep. of Germany | 340/550 |
| 1114413 | 9/1961 | Fed. Rep. of Germany | 340/550 |
| 2856819 | 7/1980 | Fed. Rep. of Germany | 340/550 |
| 2038060 | 7/1980 | United Kingdom | 340/550 |

*Primary Examiner*—Glen R. Swann, III
*Attorney, Agent, or Firm*—F. Eugene Davis, IV

[57] ABSTRACT

A security system having a mesh-like intruder detection structure for use as or with a security fence 2 or for detecting intruders jumping down from a fence or wall. The structure is made up from a number of elongated members (4, 6, 8, 10, 12, 14) each in the form of or including a fibre-optic waveguide, the elongated members being secured together at a number of spaced jointing points (20) spaced 20 cms or less apart. Portions of the elongated members at the jointing points are held in a position fixed relative to one another by encapsulating the jointing points in a plastics material (40), welding the portions together and/or surrounding them with a metal ferrule (38).

22 Claims, 11 Drawing Figures

INTRUDER DETECTION SECURITY SYSTEM

The invention relates to an intruder detection security system.

Security systems are known which include a security fence installed along a perimeter or boundary which is to be guarded against intrusion and/or escape.

The security fence may take the form of a steel wired chain-link mesh or barbed wires extending between a plurality of spaced posts positioned around the perimeter or along the boundary. Further the security fence may have fibre-optic waveguides interwoven along the wire or include in it. In operation light transmitters at one end of the waveguides transmit light along the waveguides to detectors at the other ends of the waveguides. If any of the fibre-optic waveguides is cut or stressed there is a change in the intensity of the light reaching the detector, and if the change in detected light is sufficient the detector actuates an alarm.

One disadvantage with the above known systems is that a potential intruder may be able with care to cut through the wire which is carrying the fibre-optic waveguides and then hold apart the fibre-optic waveguides to produce a gap just sufficient for him to squeeze through. If the intruder is careful and sufficiently skillful he can do this without creating too great a stress in the waveguides and the change in the light passing through those waveguides may not be sufficient to actuate the alarm. Similarly with such a system an intruder may be able to extend his arm or an implement between the wires without actuating an alarm. This may enable him to reach and interfere with vital equipment which is used in association with the security fence.

It has also been proposed in the specification accompanying U.K. patent application G.B. No. 2,038,060A to employ a mesh of optical fibres for security purposes. That specification states that the mesh of optical fibres can be embedded in a wall or incorporated into or used as a fence. The mesh described, however, when incorporated into or used as a fence has limitations in that the fibres forming the mesh can slip relative to one another at the cross-over points and so are extensible to a substantial degree without rupture. Thus there is no guarantee that the fibre optic of the mesh will rupture when a load is applied, for example by the weight of an intruder climbing the fence. With such a structure an intruder also has the possible option of gently stretching adjacent fibres apart, so as to create a gap in the mesh sufficient for the intruder to squeeze through, without there being rupture of the optical fibres. Yet a further disadvantage with such a structure is that it could not easily be assembled on site and the fence sections would probably need to be assembled at a factory and transported to the site for installation.

According to the present invention there is provided a security system comprising at least two elongated members together forming a mesh-like intruder detection structure, at least one of the elongated members being or including a fibre-optic waveguide, the structure having a number of jointing points at which portions of at least two elongated members are secured by securing means in a position fixed relative to one another, means being provided to ensure damage to the waveguide when one of the elongated members is subjected to a predetermined load, and a warning device to produce an alarm condition in response to damage to the waveguide.

In one embodiment the mesh-like structure or a series of lengths thereof is stretched to form or be supported on a fence along the perimeter or boundary of an area to be protected.

In another embodiment the mesh-like structure is located adjacent a security fence and positioned so that an intruder jumping or climbing over the fence is likely to land on and damage the mesh-like structure so producing an alarm indication.

A fibre-optic waveguide can conveniently transmit light in the visible, infra-red and ultraviolet spectrum and so preferably a light source is provided for transmitting light through the waveguide from one end thereof and a sensor is also provided responsive to the light emitted from the other end of the waveguide.

The waveguide may comprise one or more fibre-optic filaments or bundles of filaments.

The elongated members may be secured in physical contact with each other at the jointing points, or alternatively can be spaced a small distance apart at the jointing points.

Conveniently the elongated members can each comprise a waveguide surrounded or coated with a material, for example plastics material, and in one embodiment the surrounding or coating materials of two or more elongated members are secured together at the jointing points throughout the mesh-like structure. Preferably they are welded together and the welded joints at the jointing points can be encapsulated by a material. The encapsulating material is preferably a plastics material, but may be alternatively a rubber or metal or allow material.

The portions of the elongated members forming the welded joint may be in contact with the encapsulating material or may lie within a gaseous environment or evacuated space enclosed by the encapsulating material.

Preferably an insert manufactured from a material harder than those of the elongated members is also encapsulated and is disposed adjacent one or more of the elongated members whereby if one or more of the elongated members is subjected to a predetermined load the insert will cut into or cause rupture of the or each elongated member. Advantageously the insert can be arranged to enshroud the welded joint of the elongated members at the jointing points and the insert can be in the form of a ferrule having a number of jaws which clamp the portions of the elongated members adjacent the welded joint. Conveniently the insert is manufactured from metal or alloy, for example steel.

Although the insert can be used as described above to cause rupture of one or more of the elongated members it can serve the alternative or added functions of providing the jointing point with extra strength and making the jointing point more tamper proof.

In another embodiment of the present invention the surrounding or coating materials of two or more elongated members are secured together at two or more positions within the encapsulating material. Preferably they are secured together by welding so as to form two welded joints at the jointing points. As in the previous embodiment the welded joints may be in contact with the encapsulating material or may lie within a gaseous environment or evacuated space or respective gaseous environments or evacuated spaces enclosed by the encapsulating material. Also if desired each of the welded joints can have its associated insert or one insert can be associated with both welded joints.

In other embodiments of the present invention two or more elongated members at the jointing points do not come into physical content with one another, but are instead maintained a small distance apart either within the encapsulating material or within a gaseous environment or evacuated space enclosed by the encapsulating material. As with previous embodiments inserts may be provided to make the jointing points stronger, more tamper proof and if desired arranged to cut into the or each elongated member when it or they are subjected to a predetermined load.

A feature of the present invention is the provision of a mesh-like structure comprising at least two elongated members, at least one of the elongated members being or including a fibre-optic waveguide, the structure having a number of jointing points at which portions of at least two elongated members are secured by securing means in a position fixed relative to one another, means being provided to ensure damage to the waveguide when one of the elongated members is subjected to a predetermined load.

The type of intrusion which one wishes to detect determines the spacing chosen between the adjacent jointing points. For example, if one wishes to use the mesh-like structure in a security fence or wall to detect intrusion by individuals trying to pass through the fence or wall, then it is convenient to arrange the adjacent jointing points at spacings of 20 cms or less. On the other hand if one wishes to protect an expensive object, such as an antique vase or jewellery, by surrounding and/or covering the object with the mesh-like structure then it is convenient to select spacings between adjacent jointing points of 5 cms or less so as to detect the intrusion of an implement or of a person's arm or hand.

Another feature of the present invention is a method of producing a mesh for use as an intruder detection structure, comprising the steps of welding at least two elongated members together to form a number of welded joints, at least one of the elongated members including a fibre-optic waveguide, and encapsulating the welded joints with a material to form jointing points which ensure damage to the waveguide when one of the elongated members is subjected to a predetermined load.

A plastics material may be used for the encapsulation, the plastics material being first injection moulded into two parts, the two parts being arranged around one or more of the welded joints and the two parts then being welded together, for example by ultrasonics, so as to encapsulate one or more of the welded joints.

Conveniently the method can include the step of surrounding said one or more welded joints with a material harder than the elongated members before encapsulation by the plastics material.

In order to strengthen the mesh-like structure in such a way that a fibre optic waveguide will rupture for a predetermined load threshold, for example 30 to 40 lbs wt acting on an elongate member, it is convenient to incorporate a number of elongate strength members in the elongated members.

A preferred construction is to surround the waveguide with a plurality, conveniently 4, 6, or 8, of elongate strength members symmetrically disposed around the waveguide, the strength members being embedded in the surrounding material around the waveguide and extending parallel to the waveguide. Conveniently the strength members are made of kevlar. By altering the number and form of the strength members in the surrounding material one can adjust the load threshold before the waveguide ruptures.

The invention will be further described, by way of example, with reference to the accompanying drawings, in which:

FIG. 3A is an enlargement of a detail of FIG. 3, FIGS. 4, 5, and 6 are other forms of jointing points for use in the security fence of FIG. 1.

Figure 1:
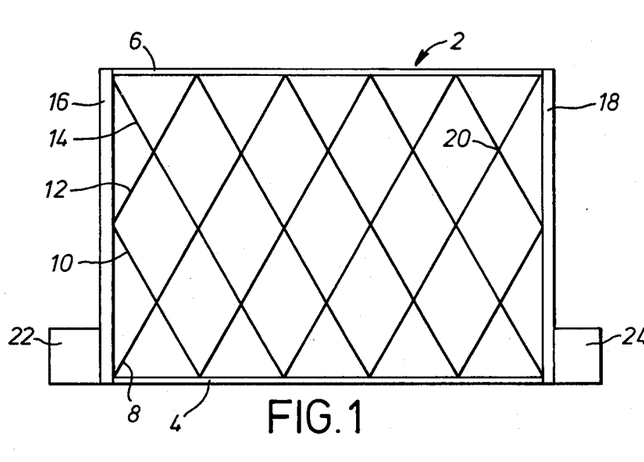
FIG. 1 is a mesh-like structure shown as a section of a security fence in a security system according to one embodiment of the present invention.

FIG. 1 illustrates one section of a security fence 2 made from a plurality of elongated members 4, 6, 8, 10, 12 and 14 in the form of optical fibres surrounded by or coated with polyvinylchloride. One form of elongated member is better illustrated in FIG. 9 in which the optical fibre (1) is shown loosely housed within a PVC tube, the tube incorporating a number of symmetrically disposed elongate Kevlar strength members 3. The coated fibres together form a mesh-like structure carried between a pair of supporting posts 16 and 18. Elongate members 4 and 6, which are each stretched in a straight line between the posts 16 and 18, also serve as supporting members for the coated fibres 8, 10, 12 and 14 which extend in a zig-zag fashion along the length of the fence section so as to create a number of jointing points at which pairs of coated fibres are secured in a position fixed relative to one another. Two of the jointing points, which are spaced apart by 20 cms, are designated by numeral 20 and represent the points at which coated fibres 8, 10 and 12, 14 respectively are secured. At the jointing points at least a portion of each of the coated fibres are secured by securing means in a position fixed relative to each other and various ways in which this can be accomplished are described later with reference to FIGS. 3 to 7.

Figure 2:
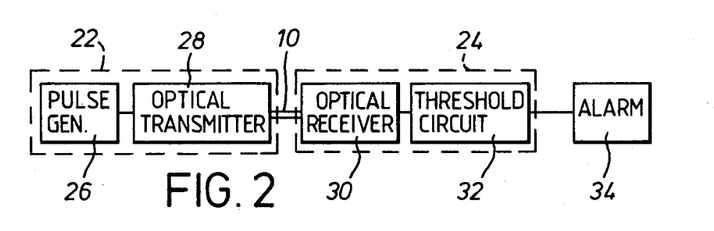
FIG. 2 is a block diagram of the security system.

The coated fibres 4, 6, 8, 10, 12 and 14 are fed down the supporting post 16 into an output control box 22 in which each optical fibre is connected to a respective optical transmitter (see FIG. 2). In a similar fashion the coated fibres 4, 6, 8, 10, 12 and 14 are fed down the supporting post 18 into an input control box 24 in which each optical fibre is connected to a respective optical receiver (see FIG. 2).

FIG. 2 illustrates schematically how each of the optical fibres, e.g. coated fibre 10, is connected between its respective optical transmitter 28 and receiver 30. The optical transmitter 28 receives electrical pulses of a particular frequency transmitted by a pulse generator 26 housed within the output control box 22. The optical transmitter, such as a light emitting diode, transmits pulses of light to the coated fibre 10 at the same frequency and each light pulse has a predetermined amplitude.

The optical receiver 30, such as a phototransistor, converts the light pulses back into electrical pulses of the same frequency. These are then amplified by an amplifier (not shown) and transmitted to a threshold circuit 32. The characteristics of the threshold circuit 32 are arranged such that if the amplitude of the electrical pulses from the amplifier falls outside a predetermined range then an output signal is transmitted to operate an alarm 34.

Figure 3:
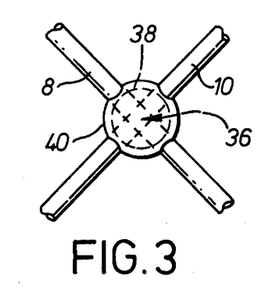
FIG. 3 is an enlarged illustration of a jointing point in the security fence of FIG. 1.
Figure 3A:
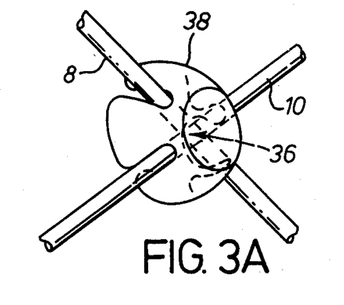

One manner in which the jointing point 20 defined by coated optical fibres 8, 10 can be formed is illustrated in FIGS. 3 and 3A. In FIG. 3 the PVC coatings of the optical fibres 8, 10 have been heat welded together at their cross-over point 36. The portions of the coated optical fibres 8, 10 immediately adjacent and surrounding the cross-over point 36 are clamped by the jaws of a steel ferrule 38 (better shown in FIG. 3A), and the whole is encapsulated by a body of plastics material 40. The plastics material is first injection moulded into two complementary parts which are arranged around the cross-over point 36 and ferrule 38, the two parts then being welded together ultrasonically. The portions of the coated optical fibres 8, 10 encapsulated within the plastics body 40 are secured by that material in a position fixed relative to each other, and thereby forms a jointing point between coated fibres 8, 10. In this embodiment the portions of the coated fibres 8, 10 at and in the vicinity of the welded joint are in contact with the encapsulating plastics material 40. In an alternative embodiment (not shown) those portions can lie within a gaseous environment or evacuated space enclosed within the material 40.

If the optical fibres 8, 10 are subjected in the vicinity of the jointing point 20 to a load above a predetermined value then one or both of the coated fibres 8, 10 will rupture.

The rupture can occur in or near the jointing point 20 or at a location between adjacent pairs of jointing points. If the jointing point is so solid as to prevent relative movement between the portions of the coated fibre within it then the rupture is likely to occur at a location near the jointing point or between adjacent jointing points. Alternatively if the jointing point is such as to allow relative movement between the portions of coated fibre at the jointing point then the rupture is more likely to occur in the fibre within the jointing point.

The steel ferrule 38 serves not only to give the jointing point 20 extra strength, but also being of a harder material than the PVC coated optical fibres 8, 10 will tend to cut into the optical fibres if they are stressed and bent against the edges of the steel ferrule 38. The steel ferrule 38 also makes the jointing point 20 more tamper proof in that even if a potential intruder could remove the plastics body 40 (perhaps by heat) he would then have an onerous and time consuming task in attempting to extricate the coated fibres 8, 10 from the steel ferrule 38 without causing rupture of the coated fibres 8, 10.

Figure 4:
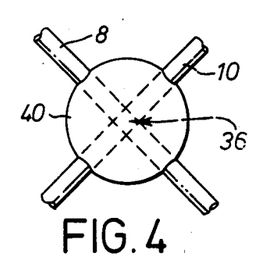

Another form of jointing point 20 is illustrated in FIG. 4. It is identical to that shown in FIG. 3 except that the steel ferrule 38 is absent. As will be appreciated from what has been described above the jointing point 20 of FIG. 4 will be weaker and less tamper proof than that of FIG. 3.

Figure 5:
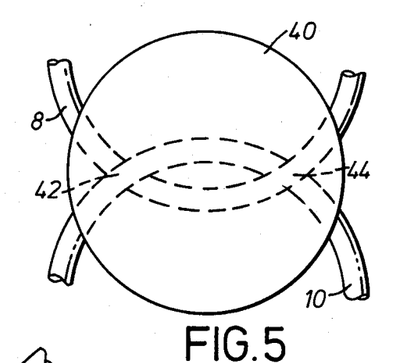

Another embodiment of a jointing point 20 is illustrated in FIG. 5 in which the PVC coatings of the coated fibres 8, 10 are welded together at two cross over points 42, 44 both encapsulated within a body of plastics material 40. The coated fibres 8, 10 are also looped together so that in FIG. 5 the coated fibre 8 overlies coated fibre 10 at cross-over point 42 but lies under coated fibre 10 at cross-over point 44. The jointing point 20 of FIG. 5 has greater strength and is more tamper proof to that of FIG. 4 but can be strengthened still further by enshrouding each of the cross-over points 42, 44 by a steel ferrule similar to that shown in FIG. 3A.

Figure 6:
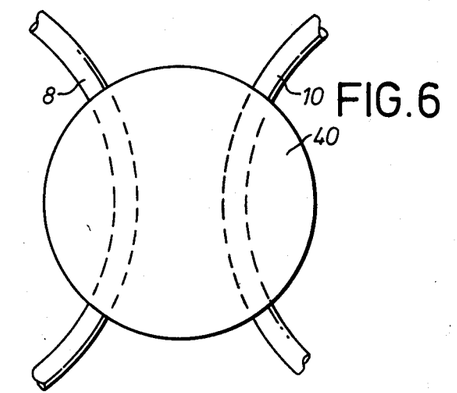
Figure 6A:
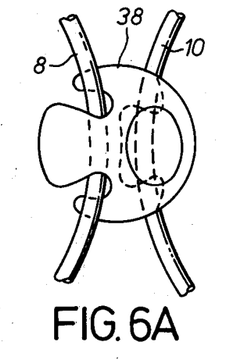
FIG. 6A is an enlargement of a detail of FIG. 6 with an insert.

A further embodiment of a jointing point 20 is illustrated in FIG. 6 in which the PVC coated optical fibres 8, 10 do not actually cross-over one another but come close to one another within the body of plastics material 40. In this embodiment the portions of the optical fibres 8, 10 are held in a position fixed relative to one another solely by the encapsulating plastics material 40. The jointing point in the embodiment of FIG. 6 is weaker and less tamper proof than any of the other embodiments described above in that it may be possible for an intruder to separate the coated fibres 8, 10 by melting away the plastics material 40. As in the case of other embodiments, however, a steel ferrule similar to that of FIG. 3A can be employed as is shown in FIG. 6A.

Figure 9:
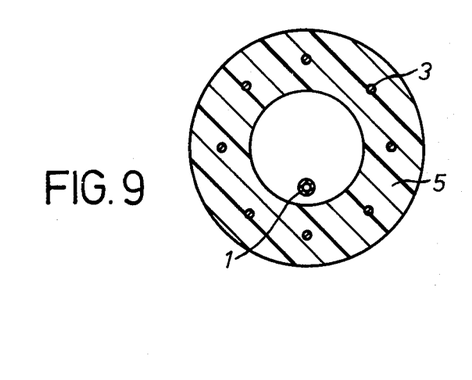
FIG. 9 illustrates one form of elongate member which can be used in the mesh-like structure.

In all the embodiments of the jointing points shown in FIGS. 3 to 6A the portions of the optical fibres at the jointing points are secured in a fixed position relative to one another by means of the body of encapsulating plastics material 40. The fibres extending between the jointing points may or may not be loosely fitted within a tube 5 as illustrated in FIG. 9 but if they are those fibres are clamped between the deformed sides of the tube 5 at the jointing points preventing movement of the fibre through the tube at the jointing point. In some of the embodiments the jointing points are strengthened and made more tamper proof by welding together the elongated members at cross-over points and/or incorporating a steel ferrule. In all of the embodiments described above when a load above a predetermined value is applied to one or both of the coated fibres 8, 10 that load is transmitted to adjacent jointing points and is concentrated at those adjacent jointing points as the coated fibres are secured there, and consequently rupture of one or both of the optical fibres will occur. The rupture may occur either inside or outside the jointing point by virtue of tensile and/or bending forces acting on the coated fibres. Alternatively rupture may occur as a result of the steel ferrule cutting into the optical fibre.

Figure 7:
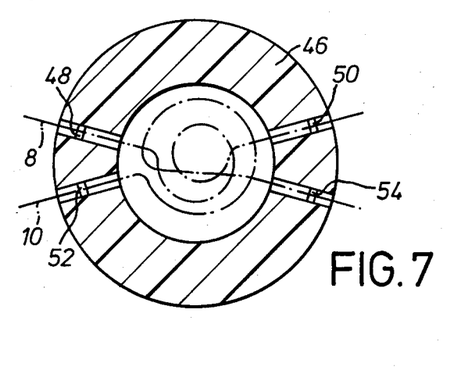
FIG. 7 is yet a further form of jointing point.

Another embodiment of a jointing point is illustrated in FIG. 7 and this functions in a somewhat different manner to those previously described above. The jointing point in FIG. 7 comprises a hollow spherical plastics material 46 and the coated optical fibres 8, 10 pass in and out through small radial holes formed in the wall of the material 46. Portions of the coated optical fibres 8, 10 are secured against longitudinal or transverse movement relative to the holes through which they pass by means of adhesive or plastic plugs 48, 50, 52 and 54 located in each of the holes. The portions of the coated optical fibres 8, 10 which pass through the adhesive or plastic plugs are thereby secured in a position fixed relative to each other.

Within the hollow of the plastics material 46 the coated optical fibres 8, 10 are each looped and the two loops are interwoven together. The two loops are free to move relative to one another but their individual dimensions do not vary greatly, if at all, as the lengths of the coated optical fibres 8 and 10 within the hollow is constant.

In operation if a load above a predetermined value is applied, for example to the left hand side of optical fibre 8 in FIG. 7, then the adhesive or plastic plug 48 snaps.

This allows the coated optical fibre 8 in the hollow to be pulled taut so that the loop of coated optical fibre 8 reduces in size and grips the coated optical fibre 10. In this way both coated optical fibres 8 and 10 can be ruptured.

Figure 8:
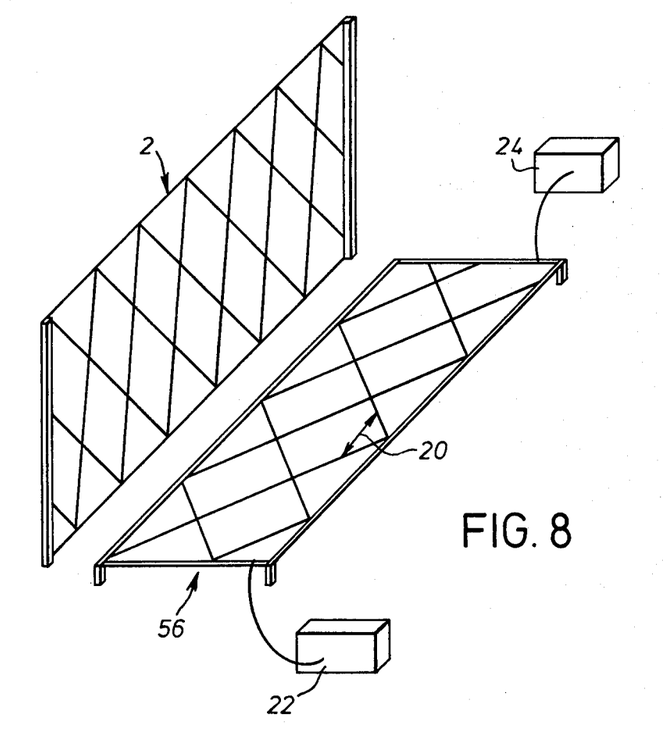
FIG. 8 illustrates how a mesh-like structure according to the present invention can be used as an anti-jump device.

FIG. 8 illustrates one way in which a mesh-like structure 56 according to the present invention can be used in a security system as an anti-jump device. The anti-jump device 56 is identical in all major respects to the security fence described in FIG. 1 except that in use it is laid horizontally behind a wall or as is shown in FIG. 8 behind a security fence 2. Only one section of the anti-jump device 56 and one section of security fence 2 is shown in FIG. 8 for ease of illustration, whereas in practice a number of sections 56 would be laid in a continuous line following a contour parallel to that defined by the sections which make up the security fence. The anti-jump device 56 is connected into the security system in an identical manner to that described with reference to FIGS. 1 and 2 for the security fence.

A potential intruder who wishes to gain access into a security area protected by a wall or security fence may be able to scale the wall or find a way of climbing over the security fence without causing the operation of an alarm. He is then, however, presented with the additional obstacle of the anti-jump device 56 which can be of a suitably large width and positioned in such a way that the intruder cannot reach the ground without his weight coming into contact with the mesh-like structure which makes up the anti-jump device 56. Thus the weight of his body would exert a load on the elongated members of the anti-jump device, which load would be sufficient to rupture one or more of the optical fibres at or near jointing points 20 which can take any of the various forms as described above with reference to FIGS. 3 to 7.

As is also the case with the security fence, if the coated optical fibres are ruptured or stressed there is a change in the intensity of the optical radiation reaching the detector. If the change in detected radiation falls outside a predetermined range then the detector will transmit a signal which will operate an alarm.

I claim:

1. A security system comprising at least two elongated members (4, 6, 8, 10, 12, 14) together forming a mesh-like intruder detection structure characterised in that at least one of the elongated members (4, 6, 8, 10, 12, 14) is or includes a fibre-optic waveguide, the structure having a number of jointing points (20) at which portions of at least two elongated members (4, 6, 8, 10, 12, 14) are secured by securing means (40, 48, 50, 52, 54) in a position fixed relative to one another, means being provided to ensure damage to the waveguide when one of the elongated members (4, 6, 8, 10, 12, 14) is subjected to a predetermined load, and a warning device (24, 34) to produce an alarm condition in response to damage to the waveguide.

2. A security system as claimed in claim 1 characterised in that a light source (28) is provided for transmitting light through the waveguide from one end thereof and a sensor (30) is provided responsive to the light emitted from the other end of the waveguide.

3. A security system as claimed in claim 1 or 2 characterised in that the waveguide comprises one or more fibre-optic filaments or bundles of filaments.

4. A security system as claimed in any one of claims 1 or 2 characterised in that the elongated members (4, 6, 8, 10, 12, 14) are secured in physical contact with each other at one or more positions at the jointing points (20).

5. A security system as claimed in any one of claims 1 or 2 characterised in that the elongated members (4, 6, 8, 10, 12, 14) are spaced a small distance apart at the jointing points (20).

6. A security system as claimed in any one of claims 1 or 2 characterised in that the elongated members (4, 6, 8, 10, 12, 14) each comprise a waveguide surrounded or coated with a material, the surrounding or coating materials of two or more elongated members (4, 6, 8, 10, 12, 14) being secured together at the jointing points (20).

7. A security system as claimed in claim 6 characterised in that the surrounding or coating materials of the two or more elongated members (4, 6, 8, 10, 12, 14) are welded together at the jointing points (20).

8. A security system as claimed in any one of claims 1 or 2 characterised in that the jointing points (20) are encapsulated by a material (40).

9. A security system as claimed in claim 8 characterised in that the portions of the elongated members at the jointing points (20) are in contact with the encapsulating material (40).

10. A security system as claimed in claim 8 characterised in that the portions of the elongated members at the jointing points (20) lie within a gaseous environment or evacuated space enclosed by the encapsulating material (40, 46).

11. A security system as claimed in any one of claims 8 characterised in that an insert (38) manufactured from a material harder than the elongated members (4, 6, 8, 10, 12, 14) is encapsulated in the encapsulating material (40) and disposed adjacent one or more of the elongated members (4, 6, 8, 10, 12, 14) to cut into or cause rupture of the or each elongated member (4, 6, 8, 10, 12) when one or more of the elongated members is subjected to a predetermined load.

12. A security system as claimed in claim 11 characterised in that the insert is in the form of a ferrule (38) surrounding the elongated members at the jointing points (20).

13. A security system as claimed in claim 7 characterised in that the surrounding or coating materials of two or more elongated members (4, 6, 8, 10, 12, 14) are welded together at two or more positions (42, 44) at the jointing points (20) and are encapsulated by a material (40).

14. A security system as claimed in any one of claims 1 or 2 characterised in that the mesh-like intruder detection structure is stretched to form or be supported on a fence (2) along a perimeter or boundary of an area to be protected.

15. A security system as claimed in any one of claims 1 or 2 characterised in that the mesh-like intruder detection structure (56) is located adjacent a security fence (2) and positioned so that an intruder jumping or climbing over the fence (2) is likely to land on and damage the mesh-like structure (56) so producing an alarm indication.

16. A security system as claimed in any one of claims 1 or 2 characterised in that adjacent jointing points (2) are spaced apart at spacings of 20 cms or less.

17. A security system as claimed in any one of claims 1 or 2 characterised in that adjacent jointing points (20) are spaced apart at spacings of 5 cms or less.

18. A mesh-like intruder detection structure comprising at least two elongated members (4, 6, 8, 10, 12, 14) characterised in that at least one of the elongated members (4, 6, 8, 10, 12, 14) is or includes a fibre-optic waveguide, the structure having a number of jointing points (20) at which portions of at least two elongated members (4, 6, 8, 10, 12, 14) are secured by securing means (40, 48, 50, 52, 54) in a position fixed relative to one another, means being provided to ensure damage to the waveguide when one or more of the elongated members (40, 48, 50, 52, 54) is subjected to a predetermined load.

19. A method of producing a mesh for use as an intruder detection structure characterised by the steps of welding at least two elongated members (4, 6, 8, 10, 12, 14) together to form a number of spaced welded joints (20), at least one of the elongated members (4, 6, 8, 10, 12, 14) including a fibre-optic waveguide, and encapsulating the welded joints (20) with a material (40) which ensures damage to the waveguide when one of the elongated members (4, 6, 8, 10, 12, 14) is subjected to a predetermined load.

20. A method as claimed in claim 19 characterised by using plastics material as the encapsulation material (40), the plastics material being first injection moulded into two parts, the two parts being arranged around one or more of the welded joints (20) and the two parts then being welded together so as to encapsulate said one or more welded joints (20).

21. A method as claimed in claim 19 or claim 20 characterised in that said one or more welded joints (20) are surrounded by a material harder than the elongated members (4, 6, 8, 10, 12, 14) before encapsulation by the plastics material (40).

22. A security system as claimed in any one of claims 1 or 2 characterised in that the elongated members (4, 6, 8, 10, 12, 14) comprise a waveguide 1 surrounded or coated by a material 5, the material 5 having embedded therein a plurality of strength members 3 symmetrically disposed around the waveguide 1.

* * * * *

UNITED STATES PATENT AND TRADEMARK OFFICE
CERTIFICATE OF CORRECTION

PATENT NO. : 4,399,430

DATED : August 16, 1983

INVENTOR(S) : Cedric A. Kitchen

It is certified that error appears in the above-identified patent and that said Letters Patent is hereby corrected as shown below:

In the title, delete "INTRUDER DETECTION SECURITY SYSTEM" and substitute therefor --RUPTURABLE FIBER-OPTIC INTRUSION DETECTOR--.

In the Abstract, line 1, delete "having" and substitute therefor --has--.

Col. 1, line 2, delete "Intruder Detection Security System" and substitute therefor --Background of the Invention--.

Col. 1, line 14, delete "include" and substitute therefor --included--.

Col. 1, between lines 55 and 56 insert heading --Summary of the Invention--.

Col. 2, line 32 delete "allow" and substitute therefor --alloy--.

UNITED STATES PATENT AND TRADEMARK OFFICE
CERTIFICATE OF CORRECTION

PATENT NO. : 4,399,430

DATED : August 16, 1983

INVENTOR(S) : Cedric A. Kitchen

It is certified that error appears in the above-identified patent and that said Letters Patent is hereby corrected as shown below:

Col. 3, line 3, delete "content" and substitute therefor --contact--.

Col. 3, line 67, delete "kevlar" and substitute therefor --Kevlar--.

Col. 4, between lines 2 and 3 insert heading --Brief Description of the Drawings--.

Col. 4, between lines 22 and 23, insert heading --Description of the Preferred Embodiments--.

Col. 5, line 67, delete "in FIG. 5"

Col. 8, line 5, delete "a small distance".

Col. 8, line 29, delete "any one of claims" and substitute therefor --claim--.

Signed and Sealed this

Seventeenth Day of January, 1989

Attest:

DONALD J. QUIGG

Attesting Officer

Commissioner of Patents and Trademarks